W. V. TURNER.
TRIPLE VALVE DEVICE.
APPLICATION FILED DEC. 16, 1910.
1,071,831.
Patented Sept. 2, 1913.
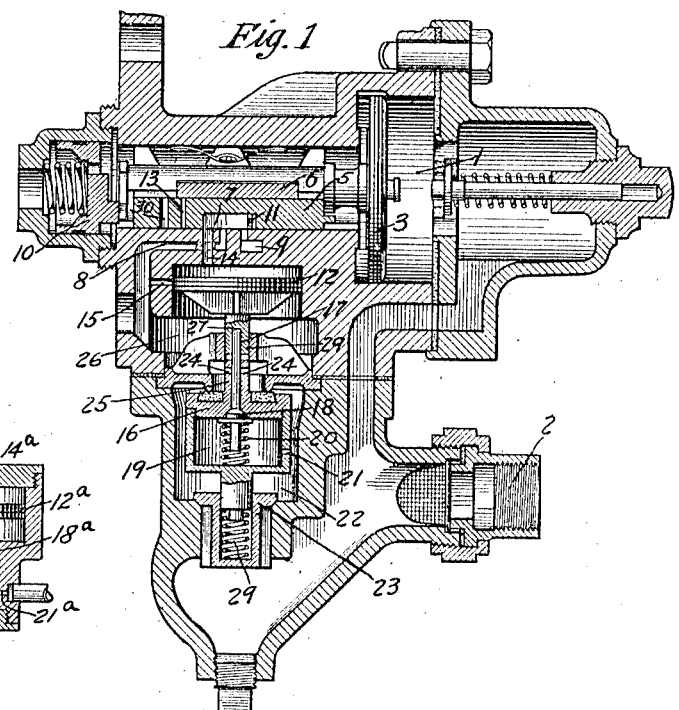
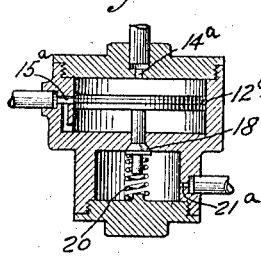
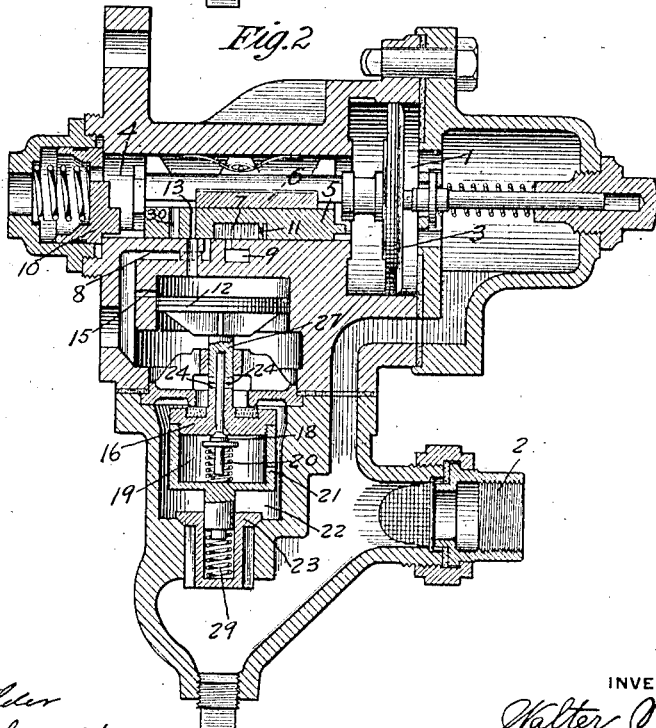
WITNESSES
INVENTOR
Walter V. Turner
by Wm. M. Cady
Att'y.

UNITED STATES PATENT OFFICE.

WALTER V. TURNER, OF EDGEWOOD, PENNSYLVANIA, ASSIGNOR TO THE WESTING-HOUSE AIR BRAKE COMPANY, OF PITTSBURGH, PENNSYLVANIA, A CORPORATION OF PENNSYLVANIA.

TRIPLE-VALVE DEVICE.

1,071,831.  Specification of Letters Patent.  Patented Sept. 2, 1913.

Application filed December 16, 1910. Serial No. 597,666.

*To all whom it may concern:*

Be it known that I, WALTER V. TURNER, a citizen of the United States, residing at Edgewood, in the county of Allegheny and State of Pennsylvania, have invented new and useful Improvements in Triple-Valve Devices, of which the following is a specification.

This invention relates to fluid pressure brakes, and has for its object to provide improved means operated by the flow of air from the auxiliary reservoir to the brake cylinder in a service application of the brakes for securing a local discharge of air from the train pipe, to thereby accelerate the action of the triple valves throughout the train.

In the accompanying drawing; Figure 1 is a sectional view of a triple valve device embodying my improvement, and showing the parts in normal full release position; Fig. 2 a similar view, showing the parts in service application position; and Fig. 3 a sectional view of a slightly modified form of my invention.

Although in the drawing, my improvement is shown as applied to a triple valve device of the retarded release type, it will be understood that my invention is adapted for use in connection with various other types of triple valves.

As shown in the drawing, the triple valve piston comprises the usual casing having a piston chamber 1, connected to train pipe 2, and containing piston 3, and a valve chamber 4 containing main slide valve 5 and auxiliary slide valve 6 mounted on and having a movement relative to the main slide valve. In the normal full release position, cavity 7 in the main slide valve 5 connects brake cylinder passage 8 with exhaust port 9 and a yielding resistance device 10 is provided to resist movement of the triple valve parts from full release position to an inner retarded release position, in which the brake cylinder passage 8 is connected through a restricted port 11 with said exhaust port 9.

According to my present improvement, the usual emergency piston 12 controls communication from the auxiliary reservoir to the brake cylinder in service applications of the brakes, the usual service port 13 being adapted in service application position to register with passage 14 leading to the chamber above said emergency piston, and a port 15 being provided through the walls surrounding said piston, so located, that it requires a certain outward movement of the emergency piston to uncover said port. The emergency piston 12, in addition to operating the usual emergency valve 16, is adapted to act on the stem 17 of a puppet valve 18. This puppet valve is contained in a chamber 19 of the emergency valve body and is normally seated by means of a coil spring 20. Said chamber has a small port 21 communicating with the check valve chamber 22, and when the valve 18 is lifted from its seat, air is free to flow from the train pipe past check valve 23 to chamber 22 and thence through port 21 to chamber 19, and the stem 17 being a loose fit, the air flows around said stem to ports 24 in a stem 25 of the emergency valve body, which ports open into the space 26, communicating with the brake cylinder. The parts are so adjusted, that normally the spring 20 maintains the emergency piston 12 in an inner position closing communication from port 14 to passage 15 and with a certain amount of lost motion between the operating stem 27 of the emergency piston and the stem 25 of the emergency valve, the lost motion being such that the emergency piston may move outwardly a distance sufficient to uncover the port 15 without engaging the stem 25.

In operation, the parts being charged up in the usual manner, if it is desired to make a service application of the brakes, the train pipe pressure is gradually reduced and thereby the triple valve piston 3 and the main and graduating valves 5 and 6 are moved out to service application position, as shown in Fig. 2. The service port 13 is thus uncovered by the graduating valve 6 and is brought into register with port 14. Air is thereupon admitted from the auxiliary reservoir to the top of the emergency piston 12 and the emergency piston is thereby actuated to uncover the port 15 and permit air to flow from the auxiliary reservoir to the brake cylinder. The outward movement of the emergency piston pushes the valve 18 off its seat and air then flows from the train pipe into the chamber 22, through port 21 to chamber 19 and thence around the stem 17 of the valve 18 through ports 24 to the chamber 26 and the brake cylinder. A local discharge of air from the train pipe to the brake cylinder is thus effected on each car and the corresponding accelerated action of all the triple valves throughout the train is produced. The engagement of the stem 27 with the stem 25 of the emergency valve prevents further outward movement of the emergency piston, as movement of the emergency valve is resisted by the usual emergency spring 29. It will be understood that the service port 13 being of the usual restricted size, and the pressure above piston 12 being prevented from building up on account of the flow to the brake cylinder through port 15, there will not be sufficient pressure on said emergency piston to move same against the resistance of the spring 29, consequently the emergency valve 16 remains seated. When flow of air from the auxiliary reservoir to the brake cylinder has reduced the auxiliary reservoir pressure to substantially equal the reduced train pipe pressure, the graduating valve 6 is moved to close the port 13 in the usual manner, and the pressures on opposite sides of the emergency piston 12 then quickly equalizing, the same returns to its normal position, closing the port 15. An emergency application of the brakes may be effected by suddenly reducing the train pipe pressure in the usual manner, whereupon the triple valve piston is shifted to the emergency position, in which the large emergency port 30 registers with port 14. The heavy flow of air from the auxiliary reservoir through this port is then sufficient to shift the emergency piston 12 to its extreme outward position lifting the emergency valve 16 off its seat and causing the usual emergency discharge of air from the train pipe to the brake cylinder.

It will be evident that the older form of puppet type graduating valve may be employed instead of the slide valve type if desired and that my improvement will operate therewith in the same manner as with the slide valve type of auxiliary valve.

Instead of the usual quick action emergency piston, a separate piston may be employed, as shown in Fig. 3, in which piston 12ª controls communication from port 14ª, adapted in service position to be connected with the service port of the triple valve device, to port 15ª which leads to the brake cylinder. The valve 18ª is operated by the piston 12ª and controls communication from port 21ª, open to the train pipe, to the brake cylinder. The operation of this arrangement will be the same as that of the device illustrated in Figs. 1 and 2, as will be clear.

Having now described my invention, what I claim as new and desire to secure by Letters Patent, is:

1. A triple valve device comprising a movable abutment subject to train pipe pressure, a valve operated by said abutment for supplying air from the auxiliary reservoir to the brake cylinder upon a gradual reduction in train pipe pressure to effect a service application of the brakes, and a piston operated by the flow of air from the auxiliary reservoir to the brake cylinder in a service application of the brakes to effect a local discharge of air from the train pipe.

2. A triple valve device comprising a movable abutment subject to train pipe pressure, valve means operated by said abutment for supplying air from the auxiliary reservoir to the brake cylinder upon a gradual reduction in train pipe pressure to effect a service application of the brakes, and a piston subject to the full flow of air from the auxiliary reservoir to the brake cylinder in a service application of the brakes for controlling a local venting of air from the train pipe.

3. A triple valve device comprising a movable abutment subject to train pipe pressure, valve means operated by said abutment and having a port affording the only means of communication from the auxiliary reservoir to the brake cylinder in a service application of the brakes, and a piston operated by the flow of air from said port to the brake cylinder for effecting a local discharge of air from the train pipe.

4. A triple valve device comprising a movable abutment subject to train pipe pressure, a main slide valve operated by said abutment and having a port adapted in service application position to afford the only means of communication from the auxiliary reservoir to the brake cylinder, a graduating valve for controlling said port, and an emergency piston operated by the flow of air through said port for effecting a local discharge of air from the train pipe.

5. A triple valve device comprising a movable abutment subject to train pipe pressure, valve means operated by said abutment and having a supply port adapted in a service application of the brakes to afford the only means of communication from the auxiliary reservoir to the brake cylinder, a valve for controlling a local train pipe vent port, and a piston operated by the flow of air through said supply port to the brake cylinder for actuating said valve.

6. A triple valve device comprising a movable abutment subject to train pipe pressure, a main slide valve operated by said abutment and having a supply port adapted, in a service application of the brakes, to afford the only means of communication from the auxiliary reservoir to the brake cylinder, an auxiliary slide valve for controlling said port, a valve for controlling a local train pipe vent port, an emergency piston operated by the flow of air from the auxiliary reservoir through said supply port to the brake cylinder for actuating said vent valve, and an emergency valve adapted to be operated by said emergency piston upon a sudden reduction in train pipe pressure for venting air from the train pipe.

7. A triple valve device comprising a movable abutment subject to train pipe pressure, valve means operated thereby and having a service port adapted upon a gradual reduction in train pipe pressure to afford the only means of communication from the auxiliary reservoir to the brake cylinder and an emergency port adapted upon a sudden reduction in train pipe pressure to supply air from the auxiliary reservoir to the brake cylinder, a valve for controlling a local train pipe discharge port, and an emergency piston operated by the flow of air through said service port for actuating said train pipe discharge valve and operated by the flow of air through said emergency port upon a sudden reduction in train pipe pressure for actuating an emergency train pipe discharge valve.

8. A triple valve device comprising a piston, valve means operated by said piston for supplying fluid from the auxiliary reservoir to the brake cylinder upon a gradual reduction in train pipe pressure, and means operated by auxiliary reservoir pressure for effecting a local discharge of air from the train pipe in a service application of the brakes.

In testimony whereof I have hereunto set my hand.

WALTER V. TURNER.

Witnesses:
S. W. KEEFER,
A. M. CLEMENTS.

---

Copies of this patent may be obtained for five cents each, by addressing the "Commissioner of Patents, Washington, D. C."